Jan. 10, 1967    K. F. TRAUMANN    3,297,471
ACRYLIC OR METHACRYLIC ACID GRAFTING COPOLYMERIZED
ON NYLON AND FORMING SALT OF SAID GRAFT
Filed April 8, 1965    2 Sheets-Sheet 1
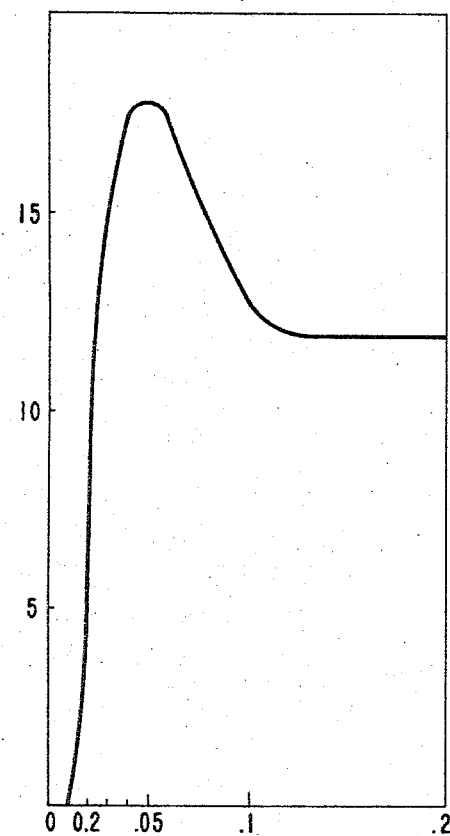
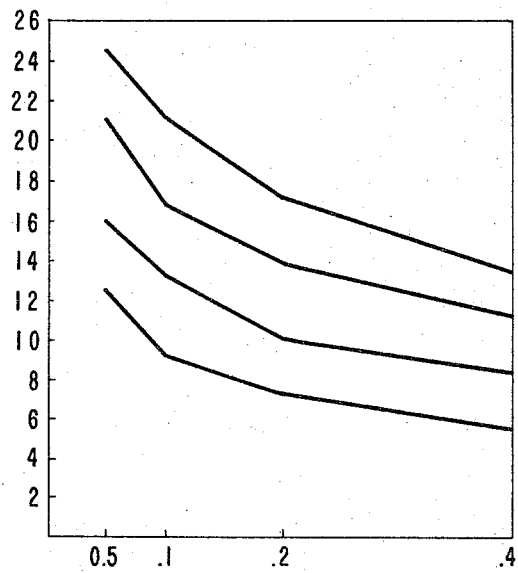
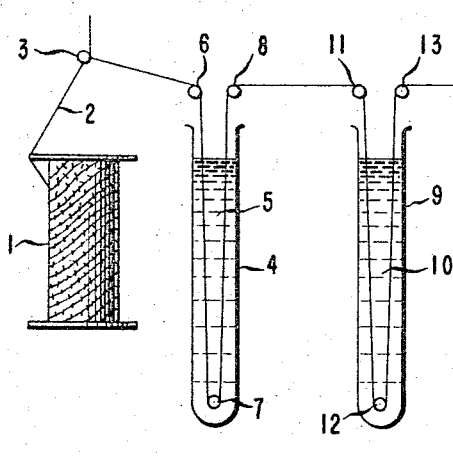
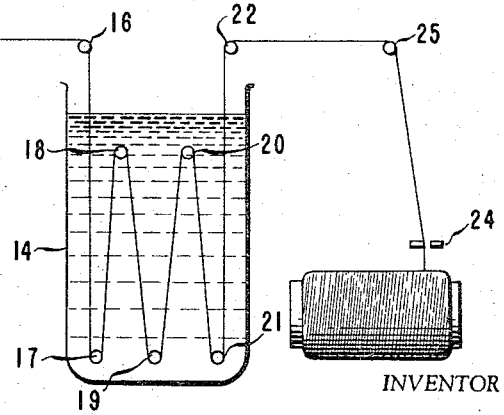
INVENTOR
KLAUS FRIEDRICH TRAUMANN
BY Carl A. Hechmer
ATTORNEY

0 — 30 μ

0 — 30 μ

0 — 30 μ

United States Patent Office 3,297,471
Patented Jan. 10, 1967

3,297,471
ACRYLIC OR METHACRYLIC ACID GRAFTING COPOLYMERIZED ON NYLON AND FORMING SALT OF SAID GRAFT
Klaus Friedrich Traumann, Wilmington, Del., assignor to E. I. du Pont de Nemours and Company, Wilmington, Del., a corporation of Delaware
Filed Apr. 8, 1965, Ser. No. 446,581
The portion of the term of the patent subsequent to Sept. 5, 1978, has been disclaimed
5 Claims. (Cl. 117—62.1)

This application is a continuation-in-part of United States application S.N. 628,857, filed December 17, 1956.

This invention relates to a novel and useful process for preparing a shaped structure of a modified polyamide product. More particularly it concerns a process for grafting, i.e., chemically adhering, an organic compound to a shaped structure produced from a synthetic polyamide.

OBJECTS

It is an object of the present invention to provide a process for preparing a shaped structure formed from a synthetic polyamide having chemically adhered thereto a salt of an unsaturated organic acid.

Another object is to provide a shaped structure of a modified polyamide by a novel and useful process wherein a salt of an unsaturated organic acid is chemically adhered to the said polyamide.

These and other objects will become apparent in the course of the following specification and claims.

STATEMENT OF INVENTION

In accordance with the present invention a process is provided for the production of a shaped structure of a modified polyamide which comprises penetrating a polyamide with a polymerizable acidic vinyl compound, graft polymerizing by initiating polymerization uniformly throughout the penetrated area by exposure to thermal polymerization initiating conditions and thereafter forming the salt of the said acid.

In accordance with one type of embodiment, a shaped polyamide structure, such as a yarn, fiber, fabric, film, flake or the like is soaked in a polymerizable vinyl acid, under non-polymerizing conditions until the desired penetration as described more fully hereinafter occurs. Thereafter the acid is both polymerized and grafted to, i.e., chemically adhered to, the polyamide into which it has penetrated by uniformly initiating polymerization throughout the penetrated area. Thermal means, as defined hereinafter, are employed to obtain uniform polymerization initiation. Non-uniform polymerization initiation has been observed to result in mere surface effects, which do not produce the useful products obtainable by the process of the present invention.

After the unsaturated organic acid is grafted to the shaped structure, a salt of the said acid is formed. Any salt such as an amine salt, a metallic salt or an ammonium salt is useful. The salts are formed in accordance with the principles governing the behavior of ion exchange resins such as are discussed by O. H. Osborn in "Synthetic Ion Exchangers" (Macmillan Publishing Co., 1956).

IDENTIFICATION OF FIGURES

FIGURE 1 is a curve relating ammonium persulfate initiator concentration as abscissa to weight of acrylic acid grafted to the nylon as ordinate at low concentrations of initiator and under relatively mild polymerization conditions. The curve is discussed in greater detail in Example V.

FIGURE 2 is a series of curves showing the same relationship as FIGURE 1 as applied to various concentrations of acid in a relatively higher concentration of initiator. These curves are discussed in greater detail in Example VI.

FIGURE 3 is a schematic representation of an apparatus suitable for practicing the process of the present invention in a continuous manner. This figure is discussed in greater detail in relation to Example X.

Figure 4:
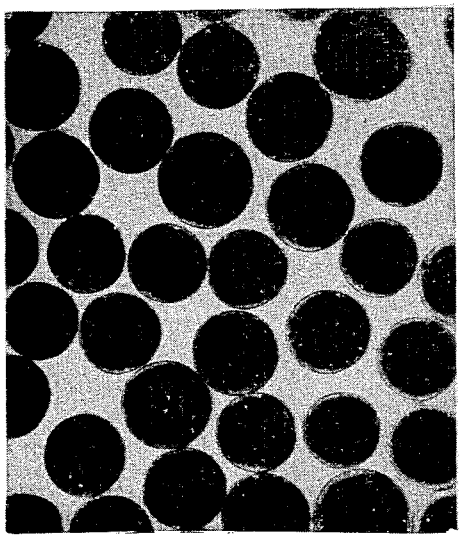
Figure 5:
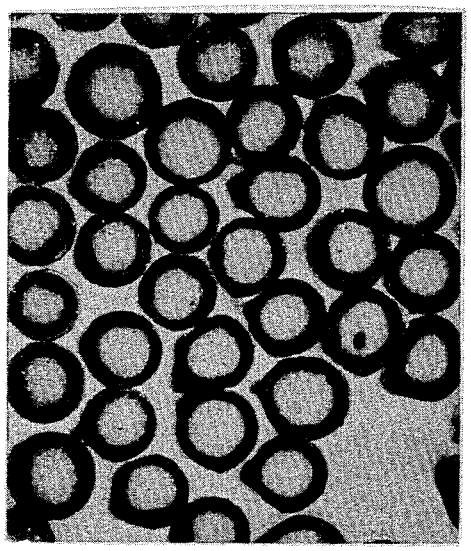
Figure 6:
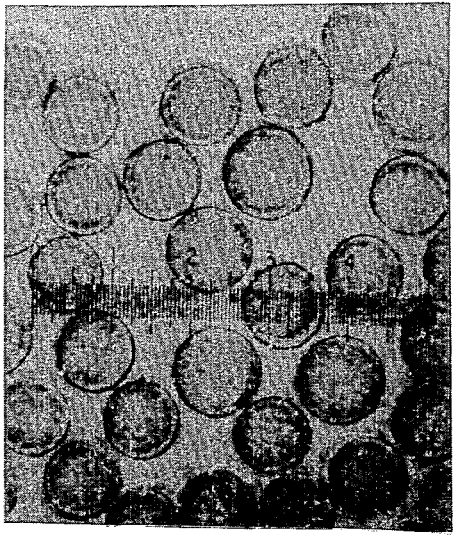

FIGURES 4, 5, and 6 are photomicrographs at a magnification of about 500 times of cross sections of filaments as produced in Example X. FIGURE 4 shows a washfast complete penetration of the filament's cross section by the dye. FIGURE 5 shows a washfast penetration of about 30% through the cross section of the filament diameter by the dye. FIGURE 6 is the untreated control showing substantially no washfast penetration of the filament diameter by the dye.

DEFINITIONS AND STANDARDS

Unless otherwise noted "66 nylon fabric" employed in the examples is a taffeta fabric, woven from 70 denier polyhexamethylene adipamide continuous filament yarn having a denier per filament of 2.0. The polyamide is produced from hexamethylenediamine and adipic acid (ergo "66"), and has a relative viscosity (as defined in United States Patent No. 2,385,890) of 37, 39 equivalents of —$NH_2$ ends and 92 equivalents of —COOH ends per $10^6$ grams of polymer (referred to hereinafter as 39 amine ends and 92 carboxyl ends, respectively). The polymer is prepared using 0.34 mol percent acetic acid stabilizer (which ends are, of course, not titratable), which is equivalent to 15 amine ends. From these data, following the method of G. B. Taylor and J. E. Waltz ("Analytical Chemistry," vol. 19, p. 448, 1942) the molecular weight (number average) is calculated to be about 13,700.

The "standard washing" to which samples are subjected consists of a 30-minute immersion in 18 liters of 70° C. water contained in a 20-liter agitation washer. The wash solution contains 0.5% of detergent. The detergent employed is that sold under the trademark "Tide" of Procter & Gamble Company of Cincinnati, Ohio. This detergent contains, in addition to the active ingredient, well over 50% (sodium) phosphates (Chemical Industries, 60, 942, July 1947). Analysis shows the composition to be substantially as follows:

| | Percent |
|---|---|
| Sodium lauryl sulfate | 16 |
| Alkyl alcohol sulfate | 6 |
| Sodium polyphosphate | 30 |
| Sodium pyrophosphate | 17 |
| Sodium silicates and sodium sulfate | 31 |

The static propensity of the fabric is indicated in terms of direct current resistance in ohms measured at 78° F. and (except where indicated otherwise) in a 50% relative humidity atmosphere. High values indicate a tendency to acquire and retain a charge and are reported as the logarithm to the base 10, being designated "log $R$."

Where quantitative values for hole melting are presented, they are measured by dropping heated glass beads of constant weight and diameter from a fixed height from a constant temperature oven onto the fabric. The temperature at which the fabric is stained is called the first damage temperature, and the temperature at which the glass bead melts completely through the fabric is referred to as the hole-melting temperature. Where the hole melting tendency is presented in qualitative terms the designation "poor" denotes a quantitative rating of about 300° C.; "fair"—a rating of about 400° C. to about 500° C.; "good"—a rating of about 600° C. or slightly better; and "excellent"—a rating well over 600° C.

The fiber melt temperature reported in some examples is determined by placing a thread, unraveled from a fabric if necessary, upon an electrically heated tube and observing the tube temperature at which visible melting or instantaneous decomposition occurs.

Post-formability is evaluated by contacting a yarn from a sample with a tube heated to about 225° C. A fiber which can be drawn in contact with the tube and without substantially fusing the filaments to two or three times its original length is designated "elastic." When the stretch is retained on cooling, it is designated "post-formable."

Crease recovery is evaluated by crumpling a fabric in the hand, and observing the rate at which it recovers from this treatment. Specifically, wet crease recovery indicates the rate at which creases disappear from the crumpled fabric when it is wetted. Numerical values are obtained using the Monsanto Crease Recovery Method, described in the American Society for Testing Materials Manual as Test No. D1295–53T.

Compositions used in the following examples are given in percent by weight, unless otherwise indicated.

The following examples are cited to illustrate the invention. They are not intended to limit it in any manner.

EXAMPLE I

Four swatches of 66 nylon fabric woven from 40 denier 34 filament yarn are placed in a polyethylene bag which is charged with a polymerizable mixture of an unsaturated organic acid consisting of 30 cc. of an aqueous solution containing 25% of acrylic acid and, as an initiator, 0.2% of ammonum persulfate. The bag is sealed and the polymerizable mixture is allowed to penetrate the fabrics at room temperature for 30 minutes. The bag is then heated at 90° C. for 1 hour to induce graft polymerization. Upon removal from the bag the fabrics have a visible coating of polyacrylic acid which is removed by 6 rinse cycles, each such cycle consisting of agitation in distilled water at 60° C. for 1 hour. The samples are employed to illustrate that the fabrics have increased in weight and carboxyl ends due to grafting of the acid to the nylon and that upon formation of the salt of the said acid the fabrics have less tendency to acquire a static charge and a higher resistance to hole melting than the untreated material.

*Increase in weight*

Sample A is Soxhlet extracted with water for 12 hours prior to the above mentioned 6 rinse cycles. It shows a 7.9% weight increase after the complete treatment.

*Increase in carboxyl ends*

Sample B is titrated for carboxyl groups and is found to contain 937 carboxyl equivalents/$10^6$ grams of polymer. The original nylon fabric has 92 carboxyl ends.

*Formation of salts*

Sample C is treated with a 1.0% solution of sodium hydroxide in distilled water. After thorough rinsing, it has a log $R$ value (at 50% R.H.) of 8.0, as compared to 13.3 for an untreated control. The sample has a very high wet crease recovery. When given five standard "Tide" washings followed by rinsing, using tap water, the sodium ion is replaced by calcium. The sample then shows a higher resistance to hole melting and a dry hand.

Sample D is agitated in a solution containing 0.3% calcium acetate in water at 60° C. for 3 consecutive cycles of 30 minutes each. The final product is highly resistant to hole melting. It is thereafter given 20 standard wash cycles using "Tide" detergent in tap water. Its resistance to hole melting remains unchanged. A 34 filament end of yarn removed from sample D, following the calcium acetate treatment, has a breaking strength of 337 grams at an elongation of 26.4%. A similar end from untreated fabric has a breaking strength of 348 grams at an elongation of 33.0%. This shows that the process of this invention has no harmful effect on the nylon breaking strength.

EXAMPLE II

The process of the present invention is useful in the treatment of film. The film structure is particularly useful in illustrating the effect of the present process upon high temperature resistance as shown below.

Two pieces of nylon film (4½ inches by 3 inches by 0.002 inch) are treated with acrylic acid-ammonium persulfate solution following the soaking and polymerizing steps described in Example I. After the treatment, Sample E is Soxhlet extracted with water for 42 hours. Sample F is rinsed in distilled water at 60° C. and post-treated with calcium acetate as described for Sample D above. Both pieces of film are placed upon a heated metal block and covered with a glass plate. Neither piece melts nor sticks to the glass plate when the temperature is increased to 300° C. Unmodified 66 nylon film melts at 264° C. It is observed that upon cooling to room temperature the film treated with the calcium acetate retains the same flexibility as the initial untreated material, whereas (E), not treated with metal ion, is brittle and degraded, and falls into pieces when flexed.

EXAMPLE III

Two 7″ x 9″ swatches of nylon taffeta, G and H, woven from 70 denier 34 filament polyhexamethylene adipamide yarn, are placed in a 10″ x 12″ polyethylene bag along with 40 ml. of a polymerizable mixture consisting of 10% freshly distilled acrylic acid, 0.05% of ammonium persulfate (initiator) and 89.95% water. The bag is sealed with pressure sensitive ("Scotch") tape to prevent the liquid from flowing out, and is then stored at room temperature for 30 minutes to permit penetration of the liquid into the polyamide structure. The bag is thereafter placed in a forced-air oven maintained at 90° C. for 1 hour to cause graft polymerization. Upon removal of the polyamide from the bag, the samples are rinsed with 60° C. distilled water followed by a 15 hour Soxhlet extraction with water. Both samples show a weight increase of from about 19% to 20%.

*Thermal and static properties*

Sample H is agitated in distilled water containing 1% sodium carbonate for a period of about 1 hour. After rinsing and drying, it is found to have a log resistivity of 7.8, as compared to 13.3 for an untreated control. It is then agitated in a solution containing 1% calcium acetate in water for a period of about 1 hour, whereby the sodium ion is replaced with calcium ion. This sample, thus modified, has a fiber melt temperature of 455° C., compared to a melt temperature of 233° C. for untreated control.

*Carboxyl ends determination*

A weighed portion of sample G is dissolved in a solution consisting of 100 parts (by weight) of methanol, 27 parts of lithium chloride, and 1 part of formaldehyde. The dissolved sample is titrated potentiometrically with methanolic sodium hydroxide, and is found to have 2130 equivalents of carboxyl groups (hereinafter referred to as 2130 carboxyl ends) per $10^6$ grams of polyamide.

*Grafting is chemical*

Since polyacrylic acid is soluble in water it is possible to show that the carboxyl groups are attached chemically to the polyamide structure by the process of the present invention. This is done by dissolving the acid grafted polyamide in a solvent and thereafter adding water to reprecipitate the polyamide (and dissolve whatever polyacrylic acid may be in the solution). To illustrate this a second portion of Sample G is dissolved in 90% formic acid, the solution is filtered, then the modified polyamide is reprecipitated by the addition of water. The precipitated polymer is filtered off, and the precipitate washed eight times with distilled water, followed by drying in a vacuum oven at 70° C. for 20 minutes. Analysis of the precipitate, following the technique described above, shows the presence of 2158 carboxyl ends.

These results show that the acrylic acid is chemically grafted to the polyamide since polyacrylic acid is water soluble.

*Penetration by acid*

A third portion of Sample G, along with an untreated control, is dyed in a bath containing a basic dye. The aqueous dye bath contains (based on the weight of fabric) 2% p-amino-phenacyl-trimethyl ammonium chloride, diazotized and coupled to N-beta-cyanoethyl-N-methyl-aniline, and 2% fatty alcohol sulfate wetting agent. The ratio of fabric to bath solution is 1:50. The samples are held in the bath for 1 hour at 100° C. Sample G dyes much deeper (orange-red) than the untreated control (yellow). By microscopic examination of the cross section of fibers taken from Sample G it is seen that they are uniformly dyed throughout the fiber, showing that each filament is completely penetrated by the acrylic acid before graft polymerization.

EXAMPLE IV

*Varying initiator concentration*

This example illustrates the effect that the variation of initiator concentration has relative to the amount of acrylic acid that is grafted to nylon under set conditions of reaction temperature and time.

A series of eight nylon samples, K to R inclusive, are soaked in polymerizable compositions containing 15% freshly distilled acrylic acid and the amounts of ammonium persulfate initiator indicated in Table 1. The technique of Example III is followed soaking at room temperature for 30 minutes, and individually heating each sample at a temperature of 90° C. for 20 minutes. Following the reaction period, the samples are rinsed in portions of hot distilled water, and the weight gain of each is determined and recorded as in Table 1.

TABLE 1

| Sample | Ammonium Persulfate Added, Percent | Fiber Wt. Gain, Percent |
|---|---|---|
| K | 0.0 | none |
| L | 0.01 | none |
| M | 0.02 | 5.5 |
| N | 0.03 | 14.7 |
| O | 0.04 | 17.4 |
| P | 0.05 | 17.9 |
| Q | 0.10 | 11.7 |
| R | 0.2 | 11.9 |

The relation between the fabric weight gain due to the grafted acrylic acid as ordinate and the initiator concentration as abscissa is plotted in graphical form in FIGURE 1. The data indicate that there is a maximum in the relationship between weight gain and catalyst concentration at about 0.04 to 0.05% ammonium persulfate. While applicant does not wish to be bound by any theory of operation, it is assumed that some minor component, present in the polymerizable composition, acts as an inhibitor to prevent grafting at very low initiator concentrations. When the reaction time is increased grafting occurs even without added initiator as shown previously.

EXAMPLE V

*Varying acrylic acid concentration*

This example illustrates the effect of the variation of acrylic acid concentration through a range of initiator concentrations upon the amount of acid grafted upon nylon under set conditions.

A series of 16 nylon samples, coded QA to QP inclusive, are soaked in the polymerizable compositions indicated in Table 2. The nylon is penetrated by soaking the samples for a period of 30 minutes and the temperature of each is raised to 100° C. over a period of about 15 seconds at which temperature polymerization occurs. The samples are retained at 100° C. for 6 minutes and then are removed, cooled, rinsed repeatedly in distilled water and the weight gain determined, with the results shown in the table. These results are expressed graphically in FIGURE 2, which shows the relation between weight of acrylic acid grafted to nylon and the concentration of ammonium persulfate, at different levels of acrylic acid treating solution. The top curve represents the use of a 25% aqueous acrylic acid concentration, with concentrations of 20%, 15% and 10% being represented by the lower curves, reading from top to bottom respectively.

TABLE 2

| Sample | Ammonium Persulfate, Percent | Acrylic Acid, Percent | Weight Gain of Fabric, Percent |
|---|---|---|---|
| QA | 0.05 | 10 | 12.6 |
| QB | 0.1 | 10 | 9.1 |
| QC | 0.2 | 10 | 7.3 |
| QD | 0.4 | 10 | 5.6 |
| QE | 0.05 | 15 | 16.0 |
| QF | 0.1 | 15 | 13.3 |
| QG | 0.2 | 15 | 10.0 |
| QH | 0.4 | 15 | 8.3 |
| QI | 0.05 | 20 | 21.2 |
| QJ | 0.1 | 20 | 16.9 |
| QK | 0.2 | 20 | 14.0 |
| QL | 0.4 | 20 | 11.3 |
| QM | 0.05 | 25 | 24.6 |
| QN | 0.1 | 25 | 21.2 |
| QO | 0.2 | 25 | 17.2 |
| QP | 0.4 | 25 | 13.6 |

EXAMPLE VI

*Polymerizing temperature*

The use of relatively high temperature for the polymerization step is advantageous in reducing the polymerization period, in permitting polymerization in the presence of inhibitors and in improving the wet crease resistance of fabrics.

A swatch of nylon fabric, coded RA, is soaked in a 25% solution of freshly distilled methacrylic acid and 0.2% ammonium persulfate for 30 minutes. The swatch, while soaking wet, is wrapped in aluminum foil and then ironed with a tailor's iron heated to 125° C. for a period of 2 minutes. After rinsing and drying, sample RA shows a weight gain of 40.5%. When the above test is repeated, except that 0.025% hydroquinone (a standard polymerization inhibitor) is present in the persulfate-containing polymerizable composition, the observed weight gain of sample RB is 10.8%, in spite of the presence of the inhibitor.

When the above test is repeated with a fresh nylon sample, RC, using a polymerizable composition containing 25% acrylic acid, 0.025% methyl ether of hydroquinone inhibitor and 0.2% ammonium persulfate, a weight gain of 14.2% is observed.

In another repetition, on a fabric sample, RD, using the test procedure of RC, with the exception that RD is wrung out before ironing, so that more than half of the wetting liquid is removed (40% pickup of liquid, based on initial fabric weight), results in a weight gain of 12.3%, in spite of the smaller superficial amount of acrylic acid available for grafting to the nylon.

When the above procedure is repeated on RE, except that the ironing period is reduced to 1 minute, the weight gain is 11.6%.

Sample RF is subjected to the process applied to RD with the exception that polymerization is induced by a 2 minute immersion in a 115–125° C. bath of DC-200 silicone oil (marketed by the Dow-Corning Corp., Midland, Michigan), a weight gain of 12.9% is observed after rinsing twice in chloroform and 5 successive washings in "Tide," a rinse in dilute acetic acid (to remove sodium ions), and two distilled water rinses.

Sample RG, is treated like RE, using instead of the silicone oil a bath of Wood's metal heated to 110–120° C., and a weight gain of 12.2% is observed.

Since inhibited acrylic and methacrylic acids can be grafted onto nylon by carrying out the grafting reaction at temperatures around 120–125° C. the costly and dangerous distillation of the unsaturated acid to remove inhibitors is avoided.

EXAMPLE VII

Use of organic initiator

The nature of the polymerization initiator, where employed, is not critical. This example illustrates the use of an organic initiator in grafting acrylic acid to nylon.

A nylon sample, S, is soaked in a polymerizable aqueous mixture containing 25% freshly distilled acrylic acid and 0.5% $\alpha,\alpha$-azodiisobutyroamidine hydrochloride. After penetration of the nylon by soaking for 30 minutes, the fabric wetted with the solution is enclosed in a polyethylene bag and heated in an oven at 60° C. for 60 minutes followed by a 30 minute heating at 90° C. After three rinsings in 60° C. distilled water the sample is reacted with a 0.3% aqueous calcium acetate solution in two cycles for 10 and 120 minutes each at a 60° C. initial temperature, followed by agitation in 60° C. distilled water for 30 minutes. The weight gain of the thus-treated sample is 3.9%, which corresponds to an average of 290 carboxyls/$10^6$ gm. of polyamide.

EXAMPLE VIII

Grafting to 6-nylon

This example illustrates the application of the process of the invention to polycaproamide, i.e., 6-nylon.

A sample of continuous filament 6-nylon taffeta, T, is soaked in a polymerizable mixture containing 25% aqueous commercial (i.e., inhibited) acrylic acid and 0.2% ammonium persulfate, for a period of 30 minutes. The sample is then removed from the solution and wrapped in aluminum foil while still dripping wet. The sample, still within the foil package, is ironed at a temperature of 115 to 125° C. for a period of two minutes. After washing the sample five times in distilled water at 60° C., using an agitation washer, for a period of ten minutes for each washing, a weight gain of 17.9%, due to grafted acrylic acid, is observed. Repetition upon a second sample, results in a weight gain of 19.2%.

When T is treated with sodium ion solution as in Example I, its log R is 8.7, it is highly wickable, and shows an exceptional degree of wet crease recovery. When treated with calcium acetate solution (as Sample D, Example I), it shows excellent resistance to hole melting and its fiber melt temperature is increased from 234° C. (for an untreated control) to 318° C.

The process of the present invention has been described in terms of a batch operation. However, the invention can very readily be carried out in a continuous manner using a running film or strand of yarn. Suitable apparatus for continuous operation is shown schematically in FIGURE 3. In the figure a package of nylon yarn 2 is unwound through eye 3 and is led into treating bath 4 containing the polymerizable composition 5 (such as 25% aqueous acrylic acid containing 0.2% ammonium persulfate) by means of roller guides 6, 7 and 8. Vessel 9 containing molten Wood's metal 10 at a temperature of 120° C. receives yarn 2 by means of roller guides 11, 12 and 13. In this vessel the acrylic acid is grafted to the nylon yarn under the influence of heat and initiator. After leaving the molten Wood's metal (10) the yarn (2) passes into bath 14 containing distilled water 15 which is heated to a temperature of 90° C. by conventional means. Roller guides 16, 17, 18, 19, 20, 21 and 22 lead the yarn through bath 14. In this vessel surface polymer is washed from the treated yarn. Thereafter the product is traversed onto package 23 by means of guide 24, after passing over roller guide 25. The acid modified polyamide yarn product may then be treated with suitable positive ions to form a salt, as has been disclosed hereinabove.

EXAMPLE IX

Continuous operation

The apparatus of FIGURE 3 is used to treat an 840 denier 140 filament nylon yarn, which is supplied from package 1. Vessel 4 contains a polymerizable composition, the content of which is shown in Table 3. Vessel 9 contains Wood's metal, which is held at a temperature of 120° C. Vessel 14 contains distilled water heated at 90° C. The yarn speed through the respective vessels is indicated in the table and from this speed and the extent of travel in each vessel, the total contact time in each vessel is calculated. The only contact of sample U with the polymerizable mixture occurs during passage through vessel 4. Sample V on the other hand is presoaked in its polymerizable solution for approximately 1 hour before passing through the equipment. Except as indicated, conditions of treatment are the same for each sample.

TABLE 3

| Sample | Aqueous Treating Solution | | Yarn Speed, yds./min. | Total Soaking Time | Grafting Time, sec. |
|---|---|---|---|---|---|
| | Acrylic acid, percent | Initiator | | | |
| U | 50 | 0.5% peracetic acid | 8.8 | 3.8 sec | 3.8 |
| V | 25 | 0.2% ammonium persulfate. | 5.6 | 1 hour | 6.0 |

At the conclusion of the acid grafting the samples are analyzed for carboxyl content and are dyed in the basic dye bath of Example III, followed by sectioning to determine the extent of deep dyeing, an indication of the depth to which the acrylic acid is grafted. A portion of each sample is boiled in a solution containing 0.5 gram of sodium carbonate per gram of nylon at a yarn to bath ratio of 1:100. The sodium salt of the acrylic acid is thus formed, and the product bearing the salt is tested for log R and fiber melt temperature. Similar tests are made on a piece of control yarn W, which was given the same treatment as the test yarns, with the exception of passing through the apparatus of FIGURE 3.

TABLE 4

| Sample | Acrylic Acid Form | | Cross Section | Sodium Salt | |
|---|---|---|---|---|---|
| | —COOH Analysis | Basic Dye Uptake | | Log R | Fiber Melt Temperature, ° C. |
| U | 200 | Fig. 5 | Deep Dyed Ring | 9.8 | 316 |
| V | 571 | Fig. 4 | Uniform | 8.8 | 360 |
| W | 51 | Fig. 6 | No Effect | 13.3 | 236 |

The results show that Sample V which has been presoaked in the acrylic acid solution long enough so that complete penetration occurs, is modified throughout its cross section and a sodium salt possesses a high degree of antistatic property and fiber melt resistance. Sample U, due to its short contact time with the polymerizing composition, is modified only near the surface, to a depth of perhaps 30% of the fiber radius. This degree of modification is sufficient to give a substantial degree of antistatic property and improved fiber melt temperature, when the sodium salt is formed. It is noteworthy that the anlysis shows carboxyls less than the preferred minimum (300), as disclosed hereinabove, but this analysis includes the unmodified core as well as the highly modified sheath or ring. Thus, the process of this invention may be suitably applied to modify the "skin" of a fiber, when for reasons such as, for example, to obtain decreased water absorption and/or improved adhesion it may be undesirable to achieve modification throughout.

EXAMPLE X

Polyhexamethylene adipamide fabric is soaked for 10 minutes at room temperature in an aqueous solution containing 30% acrylic acid (inhibited with 0.02%, on weight of acrylic acid, of methoxyhydroquinone) and 0.1 mol percent (based on moles of acrylic acid) azobisisobutyronitrile initiator. After draining to remove excess solution, the fabric is sealed in a bag made of polyethylene terephthalate film. The bag containing the flat fabric is placed on a sheet of aluminum foil and is exposed for 3 minutes to a 500 watt infrared lamp (Fostoria Corporation) at a distance of 9.5 cm. The fabric is then washed twice in 10% $Na_2CO_3$ for 1 hour at 60° C., in 2% acetic acid for 1 hour at 60° C., followed by washing in distilled water for 1 hour. After drying, the weight gain due to grafted acrylic acid is determined. The results, along with similar results using various concentrations of acid and initiator, are listed in Table 5. Each result is the average of four duplicate tests.

TABLE 5

| Sample | Soaking Solution | | Acrylic Acid Grafted, percent |
|---|---|---|---|
| | Acrylic Acid, Percent | Initiator, Mol Percent | |
| X | 30 | 0.1 | 3.0 |
| Y | 30 | 0.3 | 9.2 |
| Z | 30 | 0.4 | 11.2 |
| AA | 30 | 0.5 | 12.6 |
| AB | 40 | 0.5 | 4.7 |
| AC | 40 | 0.2 | 8.6 |
| AD | 40 | 0.4 | 15.6 |
| AE | 40 | 0.5 | 16.4 |
| AF | 40 | 0.7 | 18.1 |

EXAMPLE XI

Fabrics composed of filaments of the polyamide from bis(4-aminocyclohexyl)methane and dodecanedioic acid are treated as in Example X, except that the fabrics are exposed to the infra-red lamp for 2 minutes on each side. Treating conditions and weight gain due to grafted acrylic acid are listed in Table 6.

TABLE 6

| Sample | Soaking Solution | | Weight Gain, Percent |
|---|---|---|---|
| | Acrylic Acid, Percent | Initiator, Mol Percent | |
| AG | 50 | 0.7 | 31.8 |
| AH | 40 | 0.7 | 27.2 |
| AI | 35 | 0.7 | 22.5 |
| AJ | 35 | 0.6 | 21.3 |
| AK | 30 | 0.6 | 17.4 |
| AL | 30 | 0.5 | 17.3 |

The diamine used for the polyamide is a mixture of trans-trans, cis-trans, and cis-cis isomers.

EXAMPLE XII

About 3 pounds of 1.5 den./filament polyhexamethylene adipamide tow (100,000 total denier) is soaked for 30 min. in about 7½ liters of an aqeuous solution containing 40% acrylic acid (which contains inhibitor, as in Example X), and 0.7 mol percent (based on moles of acrylic acid) of azobisisobutyronitrile. After soaking, the tow is centrifuged for 80 to 90 sec. to remove excess acrylic acid, adhering to the filaments. The tow is then placed in a polyethylene bag to prevent loss of acrylic acid. The tow is pulled from the bag through a 1-inch diameter polytetrafluoroethylene tube which is placed inside a 6½ foot wave guide which operates in a non-resonant mode, attached to a microwave generator. The generator is operated at 2450 megacylcles.

The tow is forwarded by puller rolls through the dielectric heating tube, then through a tube 5 feet long and 4½ inches in diameter, to provide additional reaction time (termed "holding time" in Table 7) for the grafting to be completed. From the puller rolls, the tow is piddled into a tank of distilled water. The results obtained under various operating conditions are listed in Table 7.

For test AO, the tow consisted of 2 denier filaments of the polymer of Example XI, having a total denier of 100,800.

TABLE 7

| Sample | Tow Speed, Yd./Min. | Power Input, Kilowatts | Holding Time, Sec. | Weight Gain, Percent |
|---|---|---|---|---|
| AM | 3.7 | 0.7 | 30 | 16.8 |
| AN | 10 | 2.4 | 60 | 12.5 |
| AO | 3.7 | 0.7 | 10 to 14 | 18.3 |

When the tests are repeated with a tow-soaking time of about 5 minutes, only slightly decreased weight gains are observed.

EXAMPLE XIII

Substantially the same procedure as in the preceding example is repeated, using 95,000 denier tow of 3 den./fil. poly(hexamethylene adipamide). The oscillator ("Thermall" 10 kw., made by the W. T. La Rose and Associated, Cohoes, New York), used in this test was operated at 100 meg. The tow is soaked in an aqueous solution of 40% commercial (inhibited) acrylic acid and 0.2% ammonium persulfate for 2 hours at 25 C. Squeeze rolls remove excess soaking solution so that the "padding ratio" (ratio of weight of solution to weight of tow) is attained at the input end of the tetrafluoroethylene tube. The tow is pulled through the tube between parallel electrodes at a speed of about ⅓ yd. per minute. The equivalents of carboxyl groups per million grams of polymer are determined by titration, after the grafted tow has been washed twice for 30 minutes in distilled water at 90° C., boiled for 30 minutes in 2% aqueous $Na_2CO_3$, rinsed for 30 min. in 90° C. distilled water, boiled 30 min. in 3 liters of 1% aqueous acetic acid, then rinsed twice in distilled water for 30 min. at 90° C. The acid groups titrated included those normally present in the polymer, as well as those grafted. A control sample was run in which the oscillator power was turned off. Results are listed in Table 8.

TABLE 8

| Sample | Padding Ratio | Power Input, Kw. | Equiv. of —COOH Per $10^6$ Gms. |
|---|---|---|---|
| AP | 1:1 | 0 | 57 |
| AQ | 1:1 | 0.05 | 95 |
| AR | 1:1 | 0.1 | 3,710 |
| AS | 1:1 | 0.2 | 3,690 |
| AT | 4:1 | 0 | 51 |
| AU | 4:1 | 0.05 | 3,840 |
| AV | 4:1 | 0.1 | 3,940 |
| AW | 4:1 | 0.2 | 1,010 |

Polyamides

Suitable polyamides for the practice of this invention are those synthetic linear polyamides which are prepared from polymerizable monoamino carboxylic acids or their amide-forming derivatives, or from suitable diamine and suitable dicarboxylic acids, or from amide-forming derivatives of these compounds. The preferred polyamides are those wherein the intracarbonamide linkages are other than exclusively aromatic, i.e., there is at least 1 aliphatic —HCR— group in each repeating unit of the polymer molecule. The —R— group may be hydrogen, halogen, monovalent organic radical, alkylene or the like. Typical of such polyamides are those formed from an aliphatic diamine and an aliphatic acid and containing the repeating unit

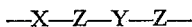

wherein —X— and —Y— represent divalent aliphatic or cycloaliphatic groups and —Z— represents the

linkage. Polyhexamethyleneadipamide and polycaproamide (i.e., "66" and "6" nylons) are typical. Other suitable polyamides are those having the repeating structure

wherein —A— is a divalent aromatic radical and —X— and —Z— are as previously defined. Polyhexamethylene terephthalamide is illustrative of such polymers. Additional polyamides having repeating units such as

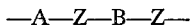

wherein —B— is divalent alkaryl (such as xylylene) may be used. Another class of suitable polyamides containing other than aromatic intracarbonamide repeating units are those prepared from piperazine, such as those from piperazine and adipic acid, piperazine and terephthalic acid and the like. Copolyamides, condensation copolymers wherein the amide linkage is the predominant linkage and polyamide mixtures are also useful. As pointed out previously, such polyamides, to form the structures of the present invention, are of a high molecular weight (i.e., they are fiber-forming and have a non-tacky surface at room temperature). As pointed out by Carothers in U.S. 2,071,253, polyamides should have a number average molecular weight of at least about 10,000 (relative viscosity, 24) to be fiber-forming. Preparation of such polyamides is illustrated in United States Patent Nos. 2,071,250; 2,071,253; and 2,130,948.

By a "shaped structure" as used herein is meant any form solid at room temperature. Thus it may be a fiber, film or pellicle. It may be in the form of a woven, knitted or felted fabric, a bristle or artificial straw. Alternatively, the structure may be a flake, powder or comminuted particle, which may be reshaped after the grafting step to form an article of specific end use. The shape is not a critical element in the treatment, except that shapes of increased thickness require a relatively more drastic condition, i.e., greater soaking time, pressure or the like, to produce satisfactory diffusion of the polymerizable composition into the polyamide shaped structure.

The polyamide shaped structure to which the unsaturated acid is grafted by the process of this invention, is characterized by a plurality of pendent acid groups which are chemically attached to the polymer chain. Such pendent acid groups are susceptible to titration, as disclosed in copending application Serial No. 595,210. To obtain the advantages of this invention, it is desirable to attach in the region where modification is desired, unsaturated acid sufficient to provide at least about 300 equivalents of such titratable acid groups per $10^6$ grams of polymer (referred to T region modified). These acid groups are the total of any free acid end groups derived from the polymer, and in addition, those derived from the organic acid grafted thereto.

Polymerizable vinyls

By a "polymerizable acidic vinyl compound" is meant any homopolymerizable organic acid and/or anhydride capable of forming a metal, an amine or an ammonium salt and which contains at least one reactive unsaturated linkage, such as a vinylene or acetylenic group, i.e., a nonaromatic unsaturated linkage. Since it is desirable that the acid penetrate into the shaped structure and low molecular weight acids penetrate the shaped structure more readily, those acids with up to 5 carbon atoms are preferred. However, acids with as many as 20 or more carbons in their chains are suitable to a lesser degree. It is desirable, to obtain maximum activation, that the double bond be in close proximity to the acid group. Such a configuration also appears to enhance the rate of penetration of the acid into the shaped structure. Suitable unsaturated monoacids are acrylic, methacrylic, crotonic, furoic and propiolic acids, for example. Homopolymerizable difunctional unsaturated acids (e.g., itaconic or fumaric acid) are also highly useful. In addition to the acids, derivatives such as acid chlorides, acid anhydrides, half acid esters and half acid amides are also effective. Any unsaturated organic compound containing functional groups which are convertible to the acid form by hydrolysis (e.g., esters, nitriles, amides), oxidation (e.g., aldehydes or ketones) or the like are suitable. The unsaturated acid may also contain substituent groups which it may be desirable to attach to the polymer to confer other properties, such as enhanced static reduction, moisture repellance, dyeability, flameproofness, etc. The said substituent groups may also be introduced by copolymerizing suitable monomers with the unsaturated acid.

Although homopolymerizable unsaturated acids are preferred for the practice of this invention, copolymerizable unsaturated acids (e.g., maleic acid, chloromaleic acid, etc.) may also be used in the polymerizable composition, when present in combination with a suitable vinyl monomer with which said acid can copolymerize.

In addition to the unsaturated carboxylic acids, which form a preferred class for the practice of this invention, other acids are useful. Such acids are the sulfonic acids (e.g., styrene sulfonic acid, ethylene sulfonic acid), unsaturated alkyl or aralkyl acid phosphates, phosphites, phosphonates and phosphinates. Acid alkyl sulfates and carbonates with unsaturated carbon-carbon bonds also have utility.

Mixtures of unsaturated acids as well as the penetration and grafting of one acid followed by the penetration and grafting of other acid are obvious technique modification.

Penetration

Because the polyamide is penetrated with a polymerizable acidic vinyl compound prior to uniform polymerization initiation, modification of the shaped structure extends at least through a substantial proportion of the body of the final product. Usually the acid is coated upon the shaped polyamide, or padded on as a dispersion, a solution, a pure liquid or as an emulsion. For liquids, spraying is useful, or the polymeric article may be dipped therein. The acid may be added as a vapor. The preferred method is to dip the shaped polyamide into a solution which contains the polymerizable composition.

The penetration is facilitated by an affinity of polyamide for unsaturated acid. Thus when nylon fabric is treated with acrylic acid solution and excess liquid is mechanically removed there is substantially more acid left in the wetted nylon than expected. Thus, mechanically removing liquid before polymerization initiation increases efficiency by decreasing loss of acid due to homopolymerization of the excess acid outside of the filaments.

Increased contact time and agitation are helpful in increasing penetration. It is sometimes beneficial to carry out the soaking for penetration at elevated temperatures (below that at which polymerization is initiated), at superatmospheric pressure or in the presence of swelling agents, dye carriers or the like. Minor amounts of wetting agents, surface active compounds and the like are useful for improving penetration efficiency.

When it is desirable to limit penetration of the polymerizable composition to a zone near the fiber surface, this may be accomplished by reduced contact time or temperature (before polymerizing), use of acids with greater chain length, or by using a lower concentration of the unsaturated acid. Where the acidic vinyl is applied from a solution, water is the preferred solvent. Other inert liquids are suitable for this purpose however, such as alcohol, benzene, toluene, high boiling ethers and the like.

While in normal application it is convenient to penetrate the shaped structure of the polyamide with the polymerizable acidic vinyl compound, it will be obvious that the vinyl can be added to a solution of the polyamide from which a shaped structure may be formed from the mixture by conventional processes such as wet or dry spinning or casting. The uniform initiation of graft polymerization may be accomplished either before, after or during the shaping operation.

Use of chemical initiators

The chemical polymerization initiator is applied in such manner to permit uniform polymerization throughout the penetrated body. While applicant does not wish to be bound by any theory of operation, it is postulated that non-uniform polymerization initiation, for instance by applying chemical initiator to the surface of an acid penetrated structure leads to "skin formation" that inhibits polymerization of the deep-seated acid. Thus where a chemical initiator used in accordance with the present invention, it is applied in admixture with the acidic vinyl under non-polymerizing conditions. As shown in the examples, the use of a chemical initiator is often convenient, since with it less drastic thermal polymerization initiation conditions are possible and the acidic vinyl may be applied in the presence of a polymerization inhibitor.

A wide variety of conventional free radical initiators may be used. Such initiators include the peroxy compounds, i.e., compounds which contain the —O—O— grouping, e.g., diacyl peroxides such as diacetyl peroxide, peroxy acids such as performic or peracetic acid, dibutyryl peroxide, dipropionyl peroxide, dibenzyl peroxide, and dialkyl peroxides such as dimethyl, diethyl, and dipropyl peroxides or per salts such as ammonium and alkali metal persulfates, perborates and percarbonates, etc. Other free radical forming initiators which may be used include the azines, e.g., benzalazine, diphenylketazine, etc., and the azo initiators such as $\alpha,\alpha'$-azodiisobutyroamidine. The preferred initiators are those which are water soluble, since it is desirable that they be consolute with the unsaturated organic acid.

As shown in the examples, low initiator concentrations increase the efficiency of grafting, and hence are preferred. In addition, high initiator concentrations (e.g., 1 to 2% ammonium persulfate) tend to yellow the nylon, making it unsuitable for some uses. Therefore, when an added initiator such as ammonium persulfate is used, concentrations of from about 0.005 to about 0.5% are recommended, with 0.01 to 0.2% the preferred range. Of course, as disclosed hereinabove, the process of this invention may be carried out with good results in the presence of a limited amount of oxygen from the air, without other added initiator.

Thermal initiation

It is usually desirable to heat the polymerizable composition in contact with the polyamide rapidly to the polymerizing temperature, which improves grating efficiency and decreases losses of acid. The temperature to be used in the polymerizing step will usually be about 60° C. or above. The upper limit is set by the volatility or decomposition temperature of the unsaturated acid. With acids of good thermal stability, it may be desirable to reduce polymerization time by carrying out the heating step under pressure. It is preferred that the temperature not exceed about 200° C. when using acrylic acid, or about 250° C. when using methacrylic acid. Higher temperatures are more effective in producing a a product with good crease recovery. Lower polymerization initiation temperatures may be employed provided the period of contact is increased. Temperatures as low as room temperature are suitable for particular combinations of acidic vinyl, chemical initiator and the like.

Titratable ends

In general, it is desirable to graft sufficient unsaturated acid to the polymeric article so that there will be at least 200 titratable acid groups per $10^6$ grams of the polymer, and preferably at least about 300 such groups. Usually the grafting of more acid will produce a greater change in the affected properties of the substrate. Amounts up to about 1,000 titratable acid groups are useful for polyamides which it is desired to be postformable, whereas even larger amounts of titratable acid groups are desirable for superior heat resistance. The mechanism by which this intermediate product is formed is not clearly understood. It is theorized that the unsaturated organic acid penetrates into the polyamide substrate and becomes chemically attached to reactive sites upon the polyamide. By "chemically attached" is meant attachment by chemical, rather than merely physical (by absorption) bonds such that the unsaturated acid cannot be removed by extraction with solvents for the acid used in the acid-modification. Furthermore, as shown in the examples, the concentration of carboxyl ends attached to the polyamide is substantially unchanged even after said polyamide has been dissolved and reprecipitated from a medium in which the polyvinyl acid alone is soluble. It is therefore apparent that the process of this invention is more than the simple application of a coating, paint or finish to the fiber surface. Initial activation apparently takes place at or close to the amine ends normally present in the polyamide. Significantly less grafting occurs when the polymer has a low amine end concentration (e.g., 5 equivalents of amine ends/$10^6$ grams polymer) or when the amine ends are destroyed by bleaching with peracetic acid prior to exposure to the unsaturated acid. It is theorized that once the polymerization of the unsaturated acid is initiated at or near the amine ends, the acid chains grow by normal vinyl polymerization mechanisms. Additional initiation sites are formed elsewhere along the polyamide molecule by chain transfer from the growing acid chains. Due to the attachment of the unsaturated acid, the polyamide becomes highly receptive to basic dyes. Cross sections of acid treated, graft modified nylon filaments dyed with basic dyes show deep dyeing throughout the fiber, proving that the acid has penetrated into the fiber.

When experimental conditions are adjusted so that complete penetration does not occur, microscopic examination of the dyed filament cross section shows a sharply defined ring which clearly defines the depth of penetration. For some purposes limited penetration is desirable. As an example, due to its high moisture regain nylon modified throughout its cross section with the sodium salt of acrylic acid may produce a cold, clammy effect to touch. This is satisfactory for fabrics which must be resistant to flash heat. However, for intimate apparel uses, it is usually desirable to limit penetration to about 10% (measured on the fiber radius) or in some cases, to as low as 5% penetration to avoid a "cold" feel. In the zone of penetration, the carboxyl end concentration is, as required, at least about $300/10^6$ gm. polymer. In cases of partial penetration, however, the 10⁶ gm. of polymer refers only to the penetration zone, and not to the non-penetrated core. Results obtained by analysis of the entire filament must be corrected for the respective content of penetrated and non-penetrated fiber, which may be determined by measurement of the cross section of the dyed filaments. In general, the number of carboxyl ends grafted upon a particular nylon sample will be directly proportional to the weight gain of the sample resulting from the grafting operation. Thus a typical nylon which in untreated form has about 92 carboxyl ends/$10^6$ gm., will possess about 439 ends after a percentage weight gain of about 3.0. The points of about 1100 and 2000 ends correspond to percentage weight gains of about 9.8 and 22.3 respectively.

Salt formation

In the final step of the process, i.e., formation of the salt of the acid, the positive ions apparently attach themselves to the carboxyl groups of the acid which has been previously grafted onto the nylon, thereby forming an ionic network which imparts the unusual and unexpected properties to the polyamide, as described herein. Many of these properties are those which are typical of a cross-linked polyamide. For example, the sodium acrylate treated polyamide of this invention is substantially insoluble in hot m-cresol, a solvent for unmodified polyamide. Unlike conventionally cross-linked polyamides, however, these polyamides of this invention remain substantially soluble in 90% formic acid. By conventionally cross-linked polyamide, of course, is meant polyamide exposed to long periods of heating (in the melt), to high temperature oxidation, or polyamide polymerized in the presence of polyfunctional acids or amines, or polyamide exposed to extremely high doses of irradiation. Any salt can be formed by simple treatment in aqueous solution, as already disclosed. Calcium ion is very readily picked up by the acid-modified polymer. If two or more cations are present in the treating solution one ion will usually be picked up in preference to the other. For example, when both sodium and calcium ions are present, the calcium salt will be formed in preference to the sodium. This is readily controlled by treating the acid-modified polymer with a solution in which calcium ion sequestrant (e.g., sodium hexametaphosphate) is included. Under those conditions of treatment, sodium ion is picked up in preference to the calcium ion. When lithium ion is substituted as the cation for sodium, then similar hydrophilic and heat resistant properties are obtained. It may at times be desirable to treat the acid-modified polymer simultaneously or consecutively with more than one species of ion to obtain multiple effects. For example, since calcium ion is very effective in improving heat resistance, after incorporating this ion throughout the body of a shaped structure, sodium ions may be attached at or near the surface (using calcium sequestrant and sodium ion) to improve the antistatic characteristics.

Among metallic salts suitable for use in the process of the present invention may be mentioned sodium carbonate, potassium carbonate, potassium acetate, calcium acetate, manganous acetate, zinc acetate, cupric acetate, cobaltous acetate, chromic acetate, and the like. Phosphate containing detergents such as "Tide" and even some hard waters are suitable as cation donors.

The dissociation constant of the acrylic acid grafted to the polyamide being $5.6 \times 10^{-5}$ *, when an attempt is made to form the salt of the acid-modified polyamide with a solution having an anion of much greater acid strength than the modifying acid, little effect in producing resistance to hole melting is observed. Good results are obtained when metal salts with acid anions weaker than those of the modifying acid are used. When the strength of the grafted acid and that of the anion of the treating salt are about equal, salt formation is facilitated by increased concentration of treating salt, as is usual with ion exchange resins.

Good resistance to hole melting is attained when the acrylic acid-modified form of the polyamide is exposed to sodium hydroxide solution. No improved hole melting resistance results however when the sodium hydroxide is replaced by sodium chloride. It has been observed that calcium ion is more efficient, on a mole basis, than sodium in improving melt resistance, while alkali ions such as sodium are preferred when improved antistatic properties are also desired. Furthermore, whereas polyamide samples modified with acrylic acid plus metal ion are postformable when about 400 or more acid groups are introduced, when higher concentrations of carboxyl groups derived from acrylic acid (e.g., over about 1000) are introduced, the samples are no longer post-formable.

Organic cations are suitable for forming the salt of the acid-modified polyamide. Any amine or quaternary ammonium compound may be employed. Among these may be mentioned ammonia, aliphatic, aromatic, cycloaliphatic and heterocyclic amines such as ethylamine, diethylamine, triethylamine, triethanolamine, guanidine, analine, benzylamine, cyclohexylamine, piperidine, morpholine and the like. So also the nature of the quaternary ammonium ion used in salt formation is not critical. Methylpyridinium chloride, trimethylbenzylammonium chloride, tetramethyl ammonium chloride and the like may be used. Polyquaternary compounds such as poly(methylpyridinium)sulfate are also useful.

Products obtained

Shaped structures of the present invention, when in the form of fabric, have been described herein primarily in terms of increased resistance to hole-melting. However, in addition to these effects, such fabrics show increased resistance to flash heat, higher zero strength temperature; when heated above their melting points, such fabrics do not drip molten polymer, or stick to adjacent surfaces. As illustrated, polyamides show a high degree of elasticity and deformability at high temperatures (e.g., above 185° C.). Because of this deformability the polyamide fabric treated in accord with the present invention (i.e., in the salt form) may be given three-dimensional shape at high temperatures (e.g., by forming or embossing), which shape is retained after cooling. The shape is retained without fusing of the individual filaments and without deleterious effect on the fabric hand. When reheated above about 185° C. the fabric returns substantially to its original shape. Yarns of the salts of acid-modified polyamide may be elongated (drawn) at temperatures of 185° C. or above.

Upon heating a shaped structure (such as a fiber or fabric) produced from the salt of the acid-modified polymer of the present invention under relaxed conditions to temperatures of 185° C. or above, a shrinkage of 50% or more is observed. Such shrinkage is in addition to that which removes earlier post-deformations. Furthermore, it permits textured effects when yarns of modified and unmodified polymer are combined in the same fabric, or when the unsaturated acid or the positive ions are applied in a pattern (i.e., non-uniformity).

In addition to the above, conventionally drawn polyamide yarn when treated as described herein becomes highly drawable at elevated temperatures (e.g., above 185° C.), as compared to the untreated yarn.

The advantages obtained by the practice of this invention have been largely described in terms of the effect on polymer properties at elevated temperatures. However, other very important changes in fabric properties can be attained by the practice of this invention. For example, fabrics to which unsaturated acid has been grafted, followed by formation of the sodium salt, thereby attain

---

* P. 29 of Heilbron Dictionary of Organic Compounds, vol. I, Oxford University Press, New York (1953).

a new degree of crease recovery (as much as 30 to 40% improvement) under conditions of high relative humidity. Thus, fabrics treated according to the process of this invention, after becoming wrinkled through use, can be brought back to their original wrinkle-free appearance by merely wetting and hanging up to dry. Ironing is not necessary.

It should be understood that the polymeric articles treated in accord with the process of this invention, may contain the usual amounts of delusterants, antioxidants and the like, whereby improved appearance, light stability, heat durability and the like are obtained.

Many equivalent modifications will be apparent to those skilled in the art from a reading of the above without a departure from the inventive concept.

What is claimed is:

1. A process which comprises contacting a solid structure of the linear, synthetic polycarbonamide, polyhexamethylene adipamide, the said polycarbonamide being free of free-radical initiating peroxy sites prior to said contact and being characterized by recurring carbonamide linkages as an integral part of the polymer chain, with a solution consisting essentially of (a) a chemical, free radical initiator from the class consisting of a peroxide, an azine and an azo initiator and (b) a polymerizable acidic compound selected from the class consisting of (1) acrylic acid and (2) methacrylic acid, the contact between the said shaped structure and the said solution being performed at a temperature below 60° C. and at a concentration of initiator sufficiently low so that substantially no polymerization of the said polymerizable compound occurs below a temperature about 60° C. and the said contact being maintained until the said solution penetrates into the said shaped structure to a depth from the surface of the said shaped structure of at least about 30% measured along the cross-sectional dimension of the said shaped structure, thereafter raising the temperature of the said shaped structure to initiate polymerization of the said polymerizable compound whereby the said polymerizable compound is graft copolymerized to the said polycarbonamide and provides at least about 200 titratable acid radicals per $10^6$ grams of polymer throughout the area into which the said solution has penetrated, and thereafter forming a salt of the said acid radicals, the said salt being selected from the class consisting of a metal salt, an amine salt, and an ammonium salt.

2. The process of claim 1 wherein the salt formed is a sodium salt.

3. The process of claim 1 wherein the salt formed is a calcium salt.

4. The process of claim 2 wherein the said polymerizable compound is acrylic acid.

5. The process of claim 3 wherein the said polymerizable compound is acrylic acid.

References Cited by the Examiner

UNITED STATES PATENTS

| 2,133,257 | 10/1938 | Strain | 260—2 |
|---|---|---|---|
| 2,253,146 | 8/1941 | Spanagel | 28—1 |
| 2,406,453 | 8/1946 | Charlton | 117—139.5 |
| 2,406,454 | 8/1946 | Charlton | 117—47 |
| 2,628,224 | 2/1953 | Cairns | 260—89.7 |
| 2,666,042 | 1/1954 | Nozaki | 260—45.5 |
| 2,837,496 | 6/1958 | Vandenberg. | |
| 2,907,675 | 10/1959 | Gaylord | 117—47 |
| 2,959,569 | 11/1960 | Warrick | 260—46.5 |
| 2,999,056 | 9/1961 | Tanner | 204—154 |
| 2,999,772 | 9/1961 | Burk | 117—138.8 |
| 3,001,922 | 9/1961 | Zimm | 204—162 |
| 3,083,118 | 3/1963 | Bridgeford | 117—47 |
| 3,099,631 | 7/1963 | Tanner | 260—2.5 |

FOREIGN PATENTS

| 1,130,631 | 7/1963 | France. |
|---|---|---|
| 679,562 | 9/1956 | Great Britain. |

OTHER REFERENCES

Lipson et al.: J. Soc. Dyers and Col., August 1949, pages 390–401, pages 392 and 396 are especially pertinent.

Naming and Indexing of Chemical Compounds by Chemical Abstracts, vol. 46, No. 24, p. 5966.

Lipson et al.: Nature, June 1, 1946, page 736.

Synthetic Resins and Allied Plastics, R. S. Morrell, 3rd ed., 1951, pp. 201 and 202.

NORMAN G. TORCHIN, *Primary Examiner.*

J. TRAVIS BROWN, *Examiner.*

D. LEVY, *Assistant Examiner.*